F. O. BOSWELL.
VEHICLE SUSPENSION AND SHOCK ABSORBER.
APPLICATION FILED OCT. 13, 1916.
1,243,694.
Patented Oct. 23, 1917.
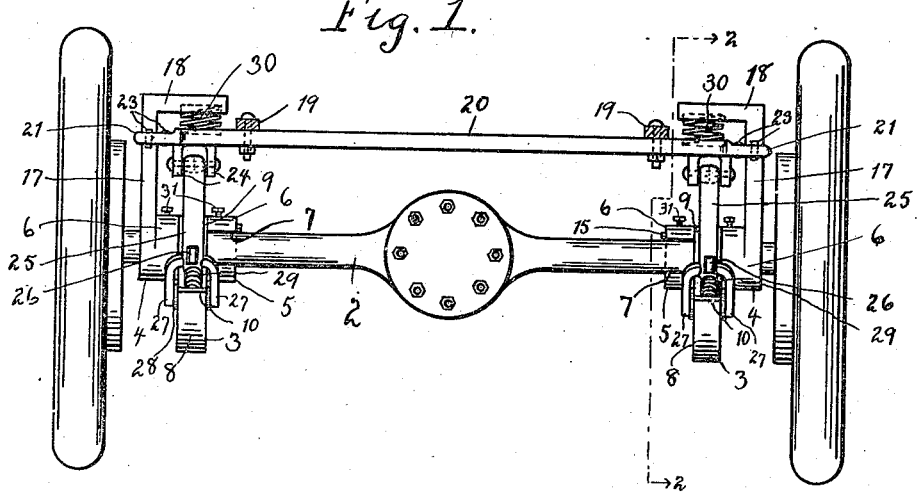
INVENTOR
Fletcher O. Boswell

UNITED STATES PATENT OFFICE.

FLETCHER O. BOSWELL, OF PHILADELPHIA, PENNSYLVANIA, ASSIGNOR TO F. O. B. MANUFACTURING CO., OF PHILADELPHIA, PENNSYLVANIA, A CORPORATION OF DELAWARE.

VEHICLE SUSPENSION AND SHOCK-ABSORBER.

1,243,694.   Specification of Letters Patent.   Patented Oct. 23, 1917.

Application filed October 13, 1916. Serial No. 125,506.

*To all whom it may concern:*

Be it known that I, FLETCHER O. BOSWELL, a citizen of the United States, residing at Philadelphia, in the county of Philadelphia and State of Pennsylvania, have invented new and useful Improvements in Vehicle Suspensions and Shock-Absorbers, of which the following is a specification.

My invention relates to new and useful improvements in a vehicle suspension and shock absorber, and has for its object to provide a device of this character which will displace the ordinary vehicle springs and which will absorb the shocks incident to the vehicle passing over obstructions upon the road.

Another object of the invention is to provide a vehicle suspension and shock absorber which may be readily and quickly attached to the vehicle in the course of construction, or which may be easily put in position in place of the springs of a finished vehicle.

A further object of the invention is to provide a pair of track members for each axle having roller carrying arms coacting therewith, said arms being pivoted to a cross bar for supporting the frame or body of the vehicle and having helical springs mounted between the different parts for producing the necessary cushioning effect and absorbing shocks.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which—

Figure 1, is an elevation view of my improved vehicle suspension and shock absorber showing it attached to one of the axles of a vehicle.

Fig. 2, is a section at the line 2—2 of Fig. 1.

Fig. 3, is a fragmentary sectional view at the line 3—3 of Fig. 2.

Fig. 4, is a similar view at the line 4—4 of Fig. 2.

Fig. 5, is a fragmentary view of the cross bar at the line 5—5 of Fig. 2.

In carrying out my invention as here embodied 2 represents an axle of the vehicle here illustrated as the rear one, composed of the axle proper and an inclosing shell or casing, but for convenience these two parts will be termed the axle, since my device is placed directly upon the axle when the same does not revolve.

On the axle is placed a pair of track members 3, one being mounted adjacent each end thereof and these track members each consist of two sections 4 and 5.

Each section comprises a sleeve 6 having an open socket or groove 7 for registering with the axle, an integral triangular body 8 projecting therefrom, the upper surface forming an inclined outer track 9 slanting downward from the sleeve and a terminal projection 10 rising above the track and provided with a spring chamber 11. The body 8 has an opening 12 therein forming an upper track 13 parallel with the track 9 and a lower slightly curved track 14.

The sleeves when placed on the axle partially surround the same with the open portions or mouths of the sockets of coacting sleeves in opposite directions and the meeting ends of sections are formed Z shaped so as to overlap, as shown in Fig. 3, the two sections being secured together upon the axle by suitable fastening means such as bolts 15 which may be threaded into the sections, or which may be passed through the sections and have nuts or burs 16 secured thereon. One of the sections, as 4, has formed with its sleeve an upright 17, the upper end having an inwardly projecting extension 18.

To the frame 19 of the vehicle, here represented by two side bars is secured the cross bar 20, the ends of which are bifurcated to form forks 21. Each fork or bifurcated end of the cross bar is adapted to surround one of the uprights 17 and has formed therewith a plurality of pairs of lugs 22 between which are journaled rollers 23 adapted to run on two edges and the inner face of the upright for keeping the vehicle frame and body in line and reducing the friction to a minimum.

On the underside of the cross bar adjacent each end are formed a pair of depending brackets or hangers 24 between which are pivoted the arms 25 arranged in pairs. In the outer end of each arm is journaled a roller 26 adapted to run upon one of the inclined outer tracks 9 and with the outer end of each arm are formed fingers 27 projecting downward and inward on each side of the body and between these fingers is journaled a roller 28 located in the opening 12, adapted to run on either the upper track 13 or the lower track 14.

Between the outer end of each arm and the adjacent terminal projection 10 is mounted a helical spring 29 for absorbing any shock caused by the vehicle passing over a rough roadbed and for cushioning any movement of the frame or body toward the axle.

A helical spring 30 is also situated at each end of the cross bar between said cross bar and the extensions of the uprights to act as buffers to prevent any downward movement of the wheels from being transmitted to the body of the vehicle or the occupants thereof.

In practice the sections of the track members are placed upon the axles of a vehicle and bolted together so as to securely fasten them in position and where necessary, as upon a round axle, set screws 31 are threaded through one or both of the section sleeves of each track member and caused to engage the axle, the latter being "spotted" if desirable, to register with the ends of the set screws.

The track members are arranged in pairs upon each axle, one of them adjacent each end thereof, and with each of these track members coöperate a pair of pivoted arms, connected in some suitable manner with the frame or body of the vehicle. The springs mounted between the arms and track members will be compressed by any downward movement of the vehicle frame or body, and at the same time the rollers 26 and 28 will run along their respective tracks 9 and 13, but as the pivot points of the arms move toward the axle, the fingers will be moved toward a vertical position, which will cause the rollers 28 to engage the lower curved track 14 so as to gradually bind thereon and limit the downward movement of the vehicle frame or body.

As the body recoils or returns to its normal position, the springs 30 will be compressed which will effectually cushion the movements between the parts and absorb any shock that would be otherwise transmitted to the vehicle body or the occupants thereof.

Of course I do not wish to be limited to the exact details of construction as herein shown, as these may be varied within the limits of the appended claims without departing from the spirit of my invention.

Having thus fully described my invention, what I claim as new and useful, is—

1. A vehicle suspension and shock absorber comprising oppositely projecting downwardly inclined tracks carried by the vehicle axles, pivoted arms or levers depending from the vehicle frame, rollers carried by said arms and coacting with the tracks, and springs mounted between portions of the tracks and the outer ends of the arms for retarding the outward and downward movement of said arms.

2. A vehicle suspension and shock absorber comprising track members adapted to be mounted upon the vehicle axles, said track members each comprising a pair of coacting sections adapted to be fastened together about the axle, each of said sections having a downwardly inclined outer track, a parallel upper track, and a slightly curved lower track, arms pivoted to the vehicle frame and having fingers formed with their outer ends, a roller journaled in the outer end of each arm for engaging the outer tracks, other rollers journaled between the fingers and located between the upper and lower tracks for engaging either of said tracks, and springs located between the outer ends of said arms and portions of the track member sections for gradually retarding the outward movement of said arms.

3. A vehicle suspension and shock absorber comprising track members adapted to be mounted upon the vehicle axles, said track members each comprising a pair of coacting sections adapted to be fastened together about the axle, each of said sections having a downwardly inclined outer track, a parallel upper track, and a slightly curved lower track, arms pivoted to the vehicle frame and having fingers formed with their outer ends, a roller journaled in the outer end of each arm for engaging the outer track, other rollers journaled between the fingers and located between the upper and lower tracks for engaging either of said tracks, springs located between the outer ends of said arms and portions of the track member sections for gradually retarding the outward movement of said arms, uprights carried by the track members, inwardly projecting extensions formed therewith, and springs located between the vehicle frame and said extensions.

4. In a vehicle suspension the combination of an axle a vehicle frame located above the same, track members located on said axle each consisting of two sections, said sections each comprising a sleeve having an open socket for engaging the axle, a triangular body formed integral therewith, the upper edge forming a downwardly inclined track, said body having an opening located therein to form an upper track parallel with the first named track, and a lower curved track, a terminal projection formed integral with the body at the outer end of the outer track, said sections being placed upon the axle from opposite sides with the open portions of the slots in opposite directions, so that the bodies of coacting sections project in opposite directions, the meeting edges of said bodies being formed Z shaped so as to overlap and detachably secured together, pivoted arms depending from the vehicle body, inwardly and downwardly projecting fingers formed with the outer ends of said arms and situated on each side of the body, rollers journaled in the outer ends of the arm and engaging the outer tracks, other rollers journaled between the fingers located in the body openings and adapted to engage either the upper or lower track, and springs situated between the outer ends of the arms and the terminal projection for retarding the outward and downward movement of said arms.

5. In a vehicle suspension the combination of an axle a vehicle frame located above the same, track members located on said axle consisting of two sections, said sections each comprising a sleeve having an open socket for engaging the axle, a triangular body formed integral therewith, the upper edge forming a downwardly inclined track, said body having an opening located therein to form an upper track parallel with the first named track, and a lower curved track, a terminal projection formed integral with the body at the outer end of the outer track, said sections being placed upon the axle from opposite sides with the open portions of the slots in opposite directions, so that the bodies of coacting sections project in opposite directions, the meeting edges of said bodies being formed Z shaped so as to overlap and detachably secured together, an upright formed with one of the sleeves of each member, an inwardly projecting extension formed with each of the uprights, springs situated between said extensions and the vehicle frame, arms adapted to be pivoted to the vehicle frame, downwardly and inwardly projecting fingers formed with the outer ends of said arms, rollers journaled in the outer ends of said arms and engaging the outer tracks, other rollers journaled between the fingers for engaging either the upper or lower tracks, and springs situated between the outer ends of said arms and the terminal lugs for retarding the outward and downward movement of said arms.

6. In a vehicle suspension the combination of an axle a vehicle frame located above the same, track members located on said axle each consisting of two sections, said sections each comprising a sleeve having an open socket for engaging the axle, a triangular body formed integral therewith, the upper edge forming a downwardly inclined track, said body having an opening located therein to form an upper track parallel with the first named track, and a lower curved track, a terminal projection formed integral with the body at the outer end of the outer track, said sections being placed upon the axle from opposite sides with the open portions of the slots in opposite directions, so that the bodies of coacting sections project in opposite directions, the meeting edges of said bodies being formed Z shaped so as to overlap and detachably secured together, an upright formed with one of the sleeves of each member, an inwardly projecting extension formed with each of the uprights, a cross bar attached to the vehicle frame, said cross bar having its ends bifurcated to partially surround the uprights, a plurality of pairs of lugs formed integral with the bifurcated ends of the cross bar, rollers journaled between said pairs of lugs and adapted to engage the edges and inner face of the uprights, springs situated between the cross bar and the inwardly projecting extensions of the uprights, a pair of arms pivoted at each end of the cross bar, the outer ends of said arms having fingers formed therewith adapted to lie on each side of the bodies of the track member sections, rollers journaled in the outer ends of said arms for engaging the outer tracks, other rollers journaled between the fingers and located in the body openings for engaging either the upper or lower tracks, and springs mounted between the outer ends of said arms and the terminal projections for retarding the outward and downward movement of said arms.

7. A vehicle suspension and shock absorber comprising track members carried by vehicle axles, coacting pivoted arms connected to the vehicle frame, rollers carried by the arms for engaging the track members, and springs located between the outer ends of said arms and portions of the track members for retarding the outward movement of said arms caused by diminishing the distance between the pivot points of the arms and the axles.

In testimony whereof, I have hereunto affixed my signature.

FLETCHER O. BOSWELL.

Copies of this patent may be obtained for five cents each, by addressing the "Commissioner of Patents, Washington, D. C."